United States Patent
Sugiura

(10) Patent No.: US 9,940,536 B2
(45) Date of Patent: Apr. 10, 2018

(54) ELECTRONIC APPARATUS AND METHOD

(71) Applicant: Kabushiki Kaisha Toshiba, Minato-ku, Tokyo (JP)

(72) Inventor: Chikashi Sugiura, Hamura Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 212 days.

(21) Appl. No.: 14/937,188

(22) Filed: Nov. 10, 2015

(65) Prior Publication Data
US 2016/0063342 A1  Mar. 3, 2016

Related U.S. Application Data

(63) Continuation of application No. PCT/JP2013/075488, filed on Sep. 20, 2013.

(51) Int. Cl.
*G06K 9/00* (2006.01)
*G06K 9/34* (2006.01)
*G06K 9/62* (2006.01)

(52) U.S. Cl.
CPC ......... *G06K 9/348* (2013.01); *G06K 9/00416* (2013.01); *G06K 9/344* (2013.01); *G06K 9/62* (2013.01); *G06K 2209/01* (2013.01)

(58) Field of Classification Search
CPC .... G06K 9/348; G06K 9/00416; G06K 9/344; G06K 9/62; G06K 2209/01
See application file for complete search history.

(56) References Cited

U.S. PATENT DOCUMENTS 5,563,959 A * 10/1996 Gallo .................. G06K 9/4609
382/187
8,503,788 B2 * 8/2013 Woo ...................... G06K 9/222
382/185

(Continued)

FOREIGN PATENT DOCUMENTS

JP    S63-62783 B1    12/1988
JP    H01-171080 A     7/1989

(Continued)

OTHER PUBLICATIONS

International Search Report mailed by Japan Patent Office dated Oct. 15, 2013 in the corresponding PCT application No. PCT/JP2013/075488—5 pages.

(Continued)

*Primary Examiner* — Jonathan S Lee
(74) *Attorney, Agent, or Firm* — Knobbe, Martens, Olson & Bear, LLP

(57) ABSTRACT

According to one embodiment, an electronic apparatus includes a processor and a display controller. The processor inputs handwritten strokes. The display controller displays a first and second character in a font size, the first character corresponding to a first handwritten character detected from the strokes, the second character corresponding to a second handwritten character detected from the strokes, the font size determined based on a combination of an attribute of the first character and a size of at least one stroke of the first handwritten character or a combination of an attribute of the second character and a size of at least one stroke of the second handwritten character.

9 Claims, 10 Drawing Sheets

| Attribute of character | Size (height) of character | Font size |
|---|---|---|
| • • • | • • • | • • • |
| • • • | • • • | • • • |
| • • • | • • • | • • • |

(56) References Cited

U.S. PATENT DOCUMENTS

| | | | | |
|---|---|---|---|---|
| 9,025,879 | B2* | 5/2015 | Sugiura | G06K 9/00416 |
| | | | | 382/181 |
| 2009/0161958 | A1* | 6/2009 | Markiewicz | G06F 3/0237 |
| | | | | 382/186 |
| 2016/0314377 | A1* | 10/2016 | Vieira | G06Q 30/0631 |
| 2016/0364607 | A1* | 12/2016 | VanBlon | G06F 3/0416 |
| 2017/0249294 | A1* | 8/2017 | Emori | G06F 17/242 |

FOREIGN PATENT DOCUMENTS

| | | |
|---|---|---|
| JP | H05-282091 A | 10/1993 |
| JP | H05-282128 A | 10/1993 |
| JP | H06-004206 A | 1/1994 |
| JP | H06-150064 A | 5/1994 |
| JP | H06-215189 A | 8/1994 |
| JP | H07-182449 A | 7/1995 |
| JP | H10-232862 A | 9/1998 |
| JP | H10-334186 A | 12/1998 |
| JP | H11-134439 A | 5/1999 |
| JP | H11-184971 A | 7/1999 |
| JP | 2001-067434 A | 3/2001 |
| JP | 2006-277224 A | 10/2006 |
| JP | 2008-059527 A | 3/2008 |

OTHER PUBLICATIONS

Written Opinion mailed by Japan Patent Office dated Oct. 15, 2015 in the corresponding PCT application No. PCT/JP2013/075488 (Japanese language only)—6 pages.

English translation of the Written Opinion of the International Search Authority mailed by the International Bureau of WIPO dated Oct. 15, 2013 in the corresponding PCT Application No. PCT/JP2013/075488—6 pages.

First Office Action mailed by Japan Patent Office dated Jul. 5, 2016 in the corresponding Japanese patent application No. 2015-537525—6 pages.

* cited by examiner

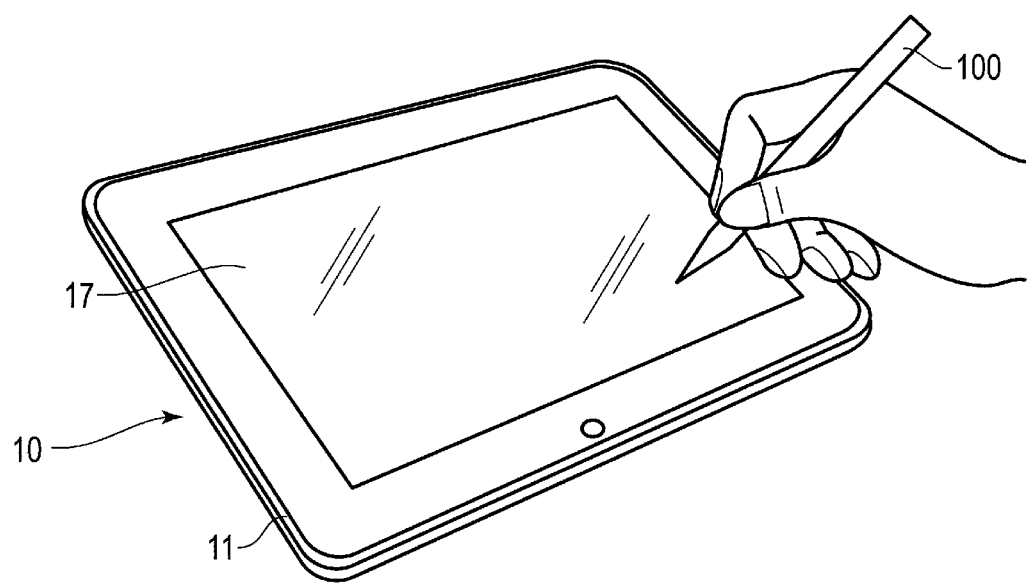
F I G. 1

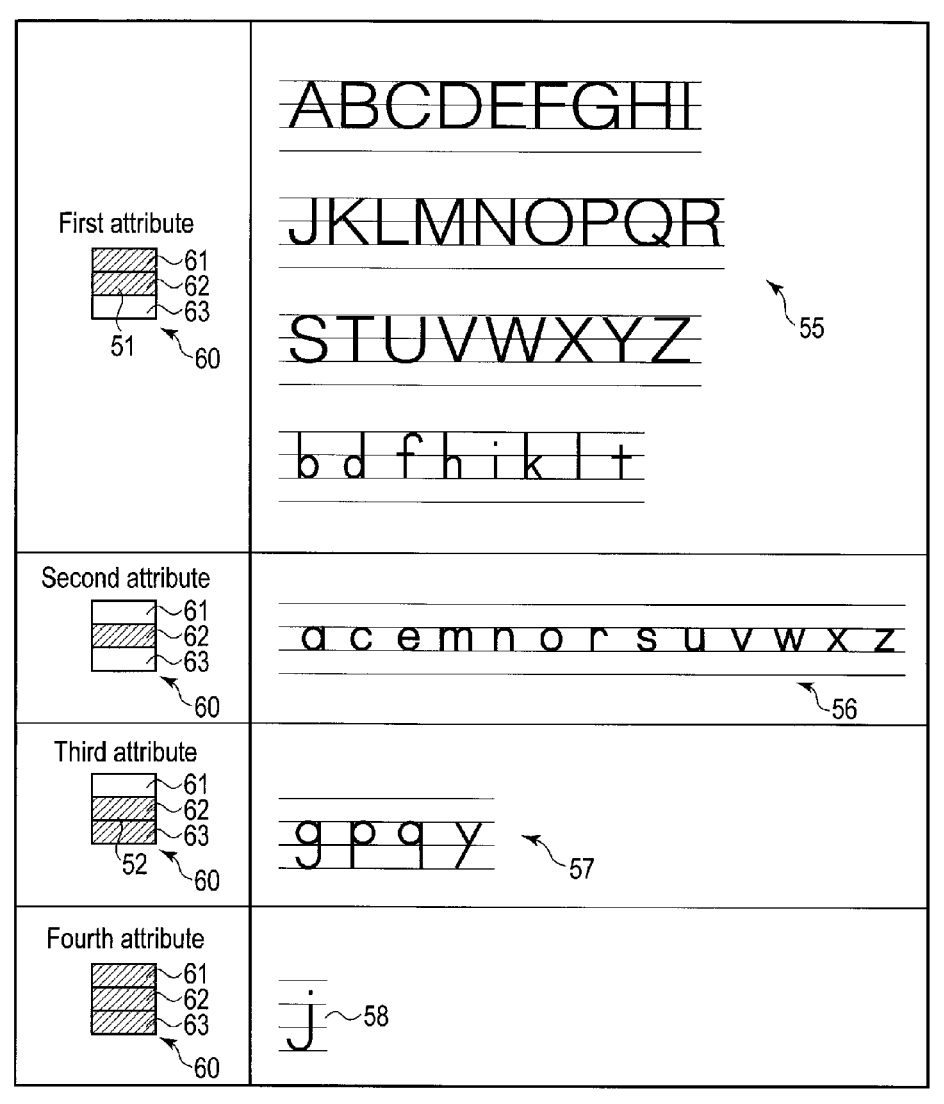

| | |
|---|---|
| First attribute<br>![](61/62/63)<br>51 60 | ABCDEFGHI<br><br>JKLMNOPQR<br><br>STUVWXYZ  ~55<br><br>b d f h i k l t |
| Second attribute<br>![](61/62/63)<br>60 | a c e m n o r s u v w x z  ~56 |
| Third attribute<br>![](61/62/63)<br>52 60 | g p q y  ~57 |
| Fourth attribute<br>![](61/62/63)<br>60 | j ~58 |

F I G. 9

| Attribute of character | Size (height) of character | Font size |
|---|---|---|
| ... | ... | ... |
| ... | ... | ... |
| ⋮ | ⋮ | ⋮ |
FIG. 10
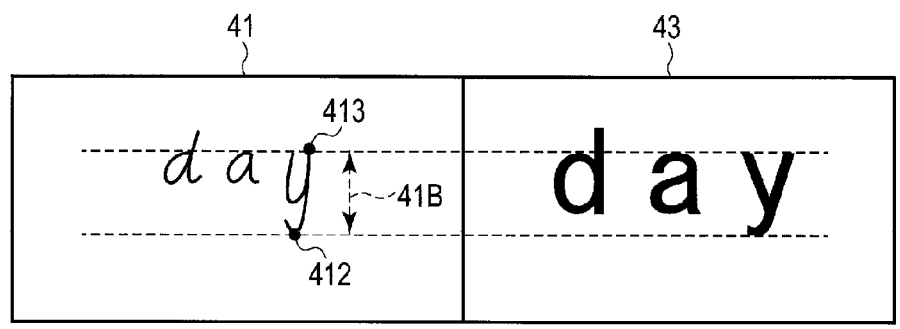
FIG. 11
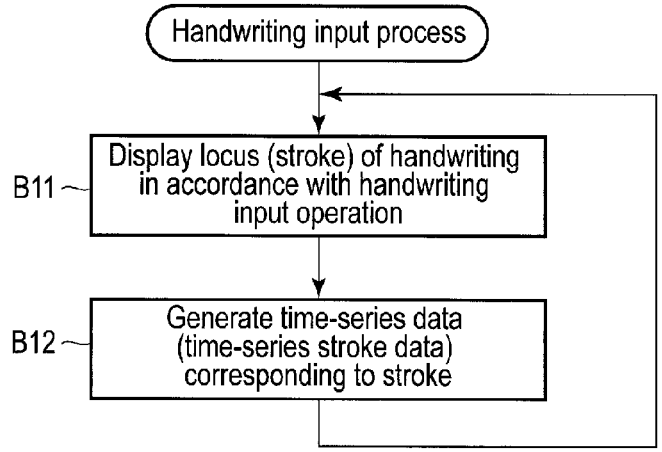
FIG. 12

ELECTRONIC APPARATUS AND METHOD

CROSS-REFERENCE TO RELATED APPLICATIONS

This application is a Continuation Application of PCT Application No. PCT/JP2013/075488, filed Sep. 20, 2013, the entire contents of which are incorporated herein by reference.

FIELD

Embodiments described herein relate generally to processing of handwritten documents.

BACKGROUND

Recently, various electronic apparatuses having a handwriting function, such as tablets, PDAs and smartphones, have been developed. In addition, the optical character recognition (OCR) technology of recognizing handwritten characters by using image data which is generated by scanning a page of paper such as a notebook in which the handwritten characters are drawn. By the technology, handwritten characters can be converted into character codes.

In the OCR, for example, characters (font) corresponding to character codes, which are a result of recognition, are displayed in a size corresponding to the size of the recognized handwritten characters on the screen.

Since characters in a handwritten document have variations in shape and size caused by handwriting, the corresponding characters (font) may be displayed in an inappropriate size.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view showing an appearance of an electronic apparatus according to an embodiment.

FIG. 9 is an exemplary illustration showing attributes of characters detected by the electronic apparatus of the embodiment.

FIG. 10 is an illustration showing an example of a font size determination table used by the electronic apparatus of the embodiment.

FIG. 11 is an illustration of another example in which handwritten characters are converted into characters (font) of an inappropriate size.

FIG. 12 is a flowchart showing an example of the procedure of a handwriting input process executed by the electronic apparatus of the embodiment.

DETAILED DESCRIPTION

Figure 2:
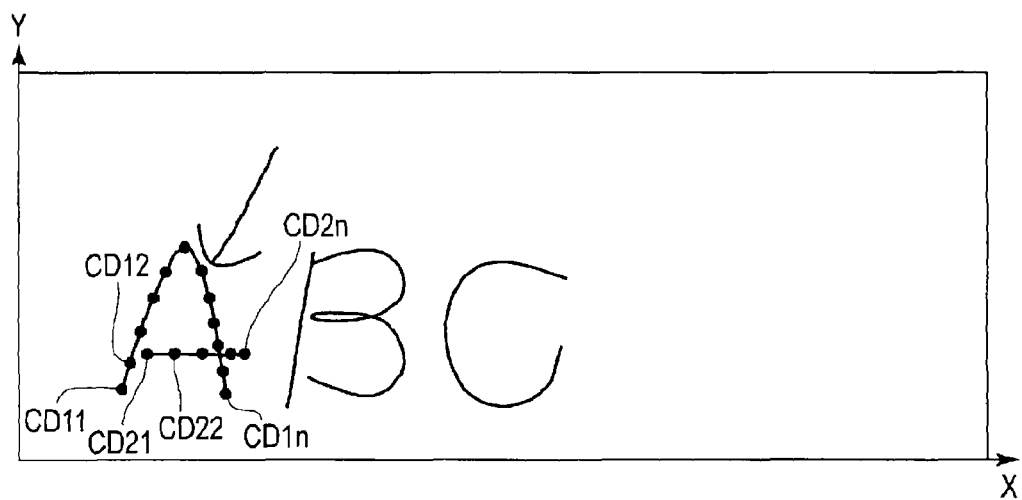
FIG. 2 is an illustration of an example of a handwritten document processed by the electronic apparatus of the embodiment.

Various embodiments will be described hereinafter with reference to the accompanying drawings.

In general, according to one embodiment, an electronic apparatus includes a processor and a display controller. The processor is configured to input strokes in handwriting. The display controller is configured to display on a screen a first character and a second character in a font size, the first character corresponding to a first handwritten character detected from the strokes, the second character corresponding to a second handwritten character detected from the strokes, the font size determined based on a combination of an attribute of the first character and a size of at least one first stroke corresponding to the first handwritten character or a combination of an attribute of the second character and a size of at least one second stroke corresponding to the second handwritten character.

FIG. 1 is an exemplary perspective view showing an appearance of an electronic apparatus of an embodiment. The electronic apparatus is, for example, a pen-based portable electronic apparatus that permits a pen (stylus) or a finger to input handwriting. The electronic apparatus can be implemented as a tablet computer, a notebook PC, a smartphone, a PDA, etc. In the description below, it is assumed that the electronic apparatus is implemented as a tablet computer 10. The tablet computer 10 is a portable electronic apparatus also called a tablet or a slate computer, and includes a body 11 and a touchscreen display 17 as shown in FIG. 1. The touchscreen display 17 is attached to the body 11 to overlap the top surface of the body 11.

The body 11 has a thin box-shaped housing. A flat panel display and a sensor configured to detect a contact position of a pen or a finger on the screen of the flat panel display are incorporated into the touchscreen display 17. The flat panel display may be, for example, a liquid crystal display (LCD). As the sensor, for example, a capacitance type touchpanel, an electromagnetic induction type digitizer and the like may be used. In the description below, it is assumed that two types of sensors, i.e., the digitizer and the touchpanel are incorporated into the touchscreen display 17.

Each of the digitizer and the touchpanel is provided to cover the screen of the flat panel display. The touchscreen display 17 can detect not only a touch operation on the screen using a finger, but also a touch operation on the screen using a pen 100. The pen 100 may be, for example, an electromagnetic induction pen.

The user can perform a handwriting input operation on the touchscreen display 17 by means of an external object (pen 100 or finger). During a handwriting input operation, a locus of the movement of the external object (pen 100 or finger)

on the screen, i.e., a locus of a stroke handwritten by the handwriting input operation is drawn in real time. The locus of each stroke is thereby displayed on the screen. The locus of the movement of the external object during the time when the external object is kept in contact with the screen corresponds to a stroke. A set of a large number of strokes, i.e., a set of a large number of loci corresponding to handwritten characters, figures and the like constitutes a handwritten document.

In the present embodiment, the handwritten document is stored in a storage medium not in the form of image data but in the form of handwritten document data including time-series data indicative of a series of coordinates of a locus of each stroke and indicative of the order relation of the strokes. The time-series data, which will be described in detail with reference to FIG. 3, generally means a set of time-series stroke data items corresponding to the strokes, respectively. Each stroke data item may be any data as long as the data is capable of expressing a stroke that can be input in handwriting. For example, each stroke data item includes a coordinate data series (time-series coordinates) corresponding to points of a locus of the stroke, respectively. The order of arrangement of the stroke data items corresponds to the order of making the strokes, i.e., the stroke order.

The tablet computer 10 can read arbitrary existing handwritten document data from the storage medium and display, on the screen, a handwritten document corresponding to the handwritten document data, i.e., a handwritten document in which loci corresponding to the strokes indicated by the time-series data, respectively, are drawn.

Next, a relationship between strokes (characters, marks, figures, tables, etc.) handwritten by the user and time-series data is described with reference to FIGS. 2 and 3. FIG. 2 shows an example of a handwritten document (handwritten character string) handwritten on the touchscreen display 17 by means of the pen 100, etc.

In the handwritten document, a character, figure or the like is often handwritten on an existing handwritten character, figure or the like. In FIG. 2, it is assumed that a character string "ABC" is handwritten in the order of "A", "B" and "C", and thereafter an arrow is handwritten close to the handwritten character "A".

The handwritten character "A" is expressed by two strokes (a locus in the form of "Λ" and a locus in the form of "-"), i.e., two loci handwritten by means of the pen 100, etc. The first handwritten locus of the pen 100 in the form of "Λ" is sampled in real time, for example, at regular intervals, and time-series coordinates CD11, CD12, . . . , CD1n corresponding to the stroke in the form of "Λ" can be thereby generated. Similarly, the subsequent handwritten locus of the pen 100 in the form of "-" is sampled, and time-series coordinates CD21, CD22, . . . , CD2n corresponding to the stroke in the form of "-" can be thereby generated.

The handwritten character "B" is expressed by two strokes, i.e., two loci handwritten by means of the pen 100, etc. The handwritten character "C" is expressed by a stroke, i.e., a locus handwritten by means of the pen 100, etc. The handwritten arrow is expressed by two strokes, i.e., two loci handwritten by means of the pen 100, etc.

Figure 3:
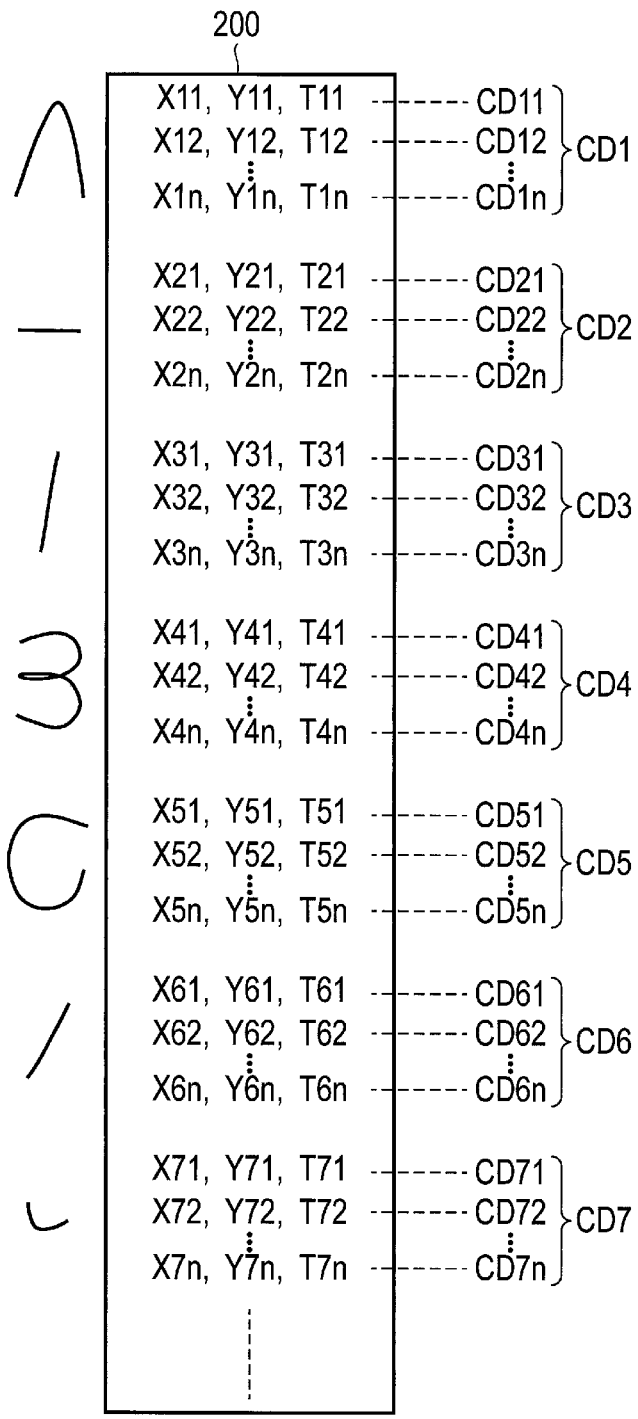
FIG. 3 is an exemplary illustration of time-series data corresponding to the handwritten document of FIG. 2 and stored in a storage medium by the electronic apparatus of the embodiment.

FIG. 3 shows time-series data 200 corresponding to the handwritten document of FIG. 2. The time-series data 200 includes stroke data items CD1, CD2, . . . , CD7. In the time-series data 200, these stroke data items CD1, CD2, . . . , CD7 are arranged on a time-series basis in the stroke order, i.e., in the order in which the strokes were handwritten.

In the time-series data 200, the first and second stroke data items CD1 and CD2 indicate the two strokes constituting the handwritten character "A", respectively. The third and fourth stroke data items CD3 and CD4 indicate the two strokes constituting the handwritten character "B", respectively. The fifth stroke data item CD5 indicates the stroke constituting the handwritten character "C". The sixth and seventh stroke data items CD6 and CD7 indicate the two strokes constituting the handwritten arrow, respectively.

Each stroke data item includes a coordinate data series (time-series coordinates) corresponding to a stroke, i.e., coordinates corresponding to points on a locus of the stroke, respectively. In each stroke data item, coordinates are arranged on a time-series basis in the order in which the stroke was handwritten. For instance, regarding the handwritten character "A", the stroke data item CD1 includes a coordinate data series (time-series coordinates) corresponding to points on the locus of the stroke "Λ" of the handwritten character "A", respectively, i.e., n coordinate data items CD11, CD12, . . . , CD1n. The stroke data item CD2 includes a coordinate data series corresponding to points on the locus of the stroke "-" of the handwritten character "A", respectively, i.e., n coordinate data items CD21, CD22, . . . , CD2n. The number of coordinate data items may differ for each stroke data item.

Each coordinate data item indicates an x-coordinate and a y-coordinate corresponding to a point on a corresponding locus. For instance, the coordinate data item CD11 indicates the x-coordinate (X11) and the y-coordinate (Y11) of the start point of the stroke "Λ". The coordinate data item CD1n indicates the x-coordinate (X1n) and the y-coordinate (Y1n) of the end point of the stroke "Λ".

Each coordinate data item may further include timestamp data T corresponding to a time at which a point corresponding to the coordinates was handwritten. The point-handwritten time may be an absolute time (for example, year, month, day, hour, second) or a relative time with respect to a certain time. For instance, an absolute time (for example, year, month, day, hour, second) when writing of a stroke has been started may be added to each stroke data item as timestamp data, and a relative time indicative of a difference from the absolute time may be further added to each coordinate data item in the stroke data item as timestamp data T.

By using time-series data in which timestamp data T is added to each coordinate data item as describe above, the temporal relationship between strokes can be expressed with higher accuracy.

Data (Z) indicative of writing pressure may be added to each coordinate data item.

As described above, a handwritten document is stored not in the form of an image or a result of character recognition, but in the form of time-series data 200 constituted by a set of time-series stroke data items in the present embodiment. Thus, handwritten characters and figures can be processed independently of language. Therefore, the structure of the time-series data 200 of the present embodiment can be commonly used in various countries having different languages around the world.

Figure 4:
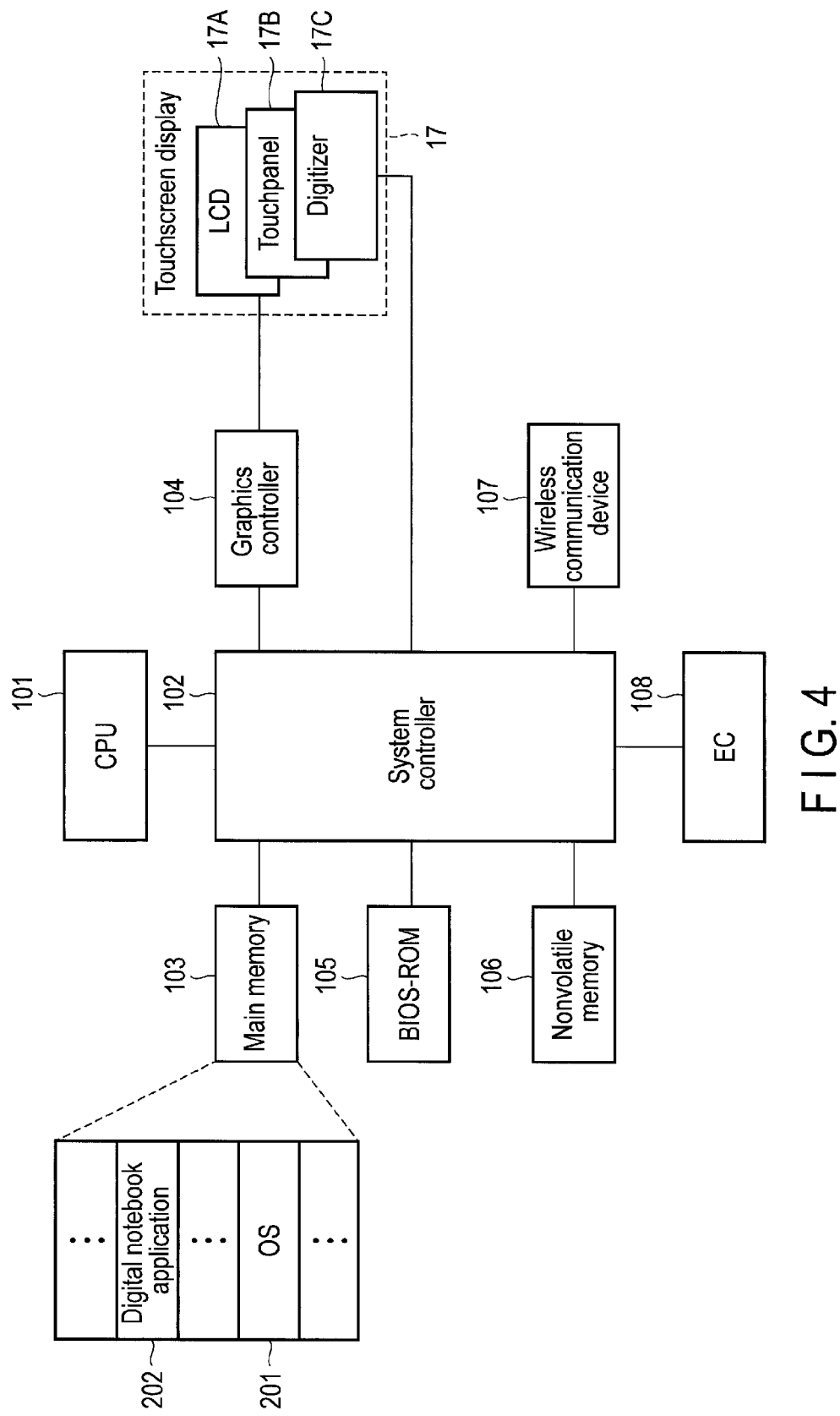
FIG. 4 is an exemplary block diagram showing a system configuration of the electronic apparatus of the embodiment.

FIG. 4 is a diagram showing a system configuration of the tablet computer 10.

As shown in FIG. 4, the tablet computer 10 includes a CPU 101, a system controller 102, a main memory 103, a graphics controller 104, a BIOS-ROM 105, a nonvolatile memory 106, a wireless communication device 107, an embedded controller (EC) 108, etc.

The CPU 101 is a processor which controls operations of various modules in the tablet computer 10. The CPU 101 executes various types of software loaded from the nonvolatile memory 106 serving as a storage device into the main memory 103. The software includes an operating system (OS) 201 and various application programs. The application programs include a digital notebook application program 202. The digital notebook application program 202 has a function of generating and displaying the handwritten document described above, a function of converting a handwritten document into a formatted document including character codes (characters corresponding to character codes), etc.

The CPU 101 also executes a basic input/output system (BIOS) stored in the BIOS-ROM 105. The BIOS is a program for hardware control.

The system controller 102 is a device which connects between a local bus of the CPU 101 and various components. The system controller 102 is equipped with a memory controller which executes access control of the main memory 103. The system controller 102 also has a function of communicating with the graphics controller 104 via a serial bus conforming to the PCI EXPRESS standard.

The graphics controller 104 is a display controller which controls the LCD 17A used as a display monitor of the tablet computer 10. A display signal generated by the graphics controller 104 is transmitted to the LCD 17A. The LCD 17A displays a screen image based on the display signal. A touchpanel 17B and a digitizer 17C are provided on the LCD 17A. The touchpanel 17B is a capacitance type pointing device to execute input on the screen of the LCD 17A. The contact position, the movement of the contact position, etc., of the finger on the screen are detected by the touchpanel 17B. The digitizer 17C is an electromagnetic induction type pointing device to execute input on the screen of the LCD 17A. The contact position, the movement of the contact position, etc., of the pen 100 on the screen are detected by the digitizer 17C.

The wireless communication device 107 is a device configured to execute wireless communication such as wireless LAN or 3G mobile communication. The EC 108 is a one-chip microcomputer including an embedded controller for power management. The EC 108 has a function of powering on or off the tablet computer 10 in accordance with a power button operation by the user.

Figure 5:
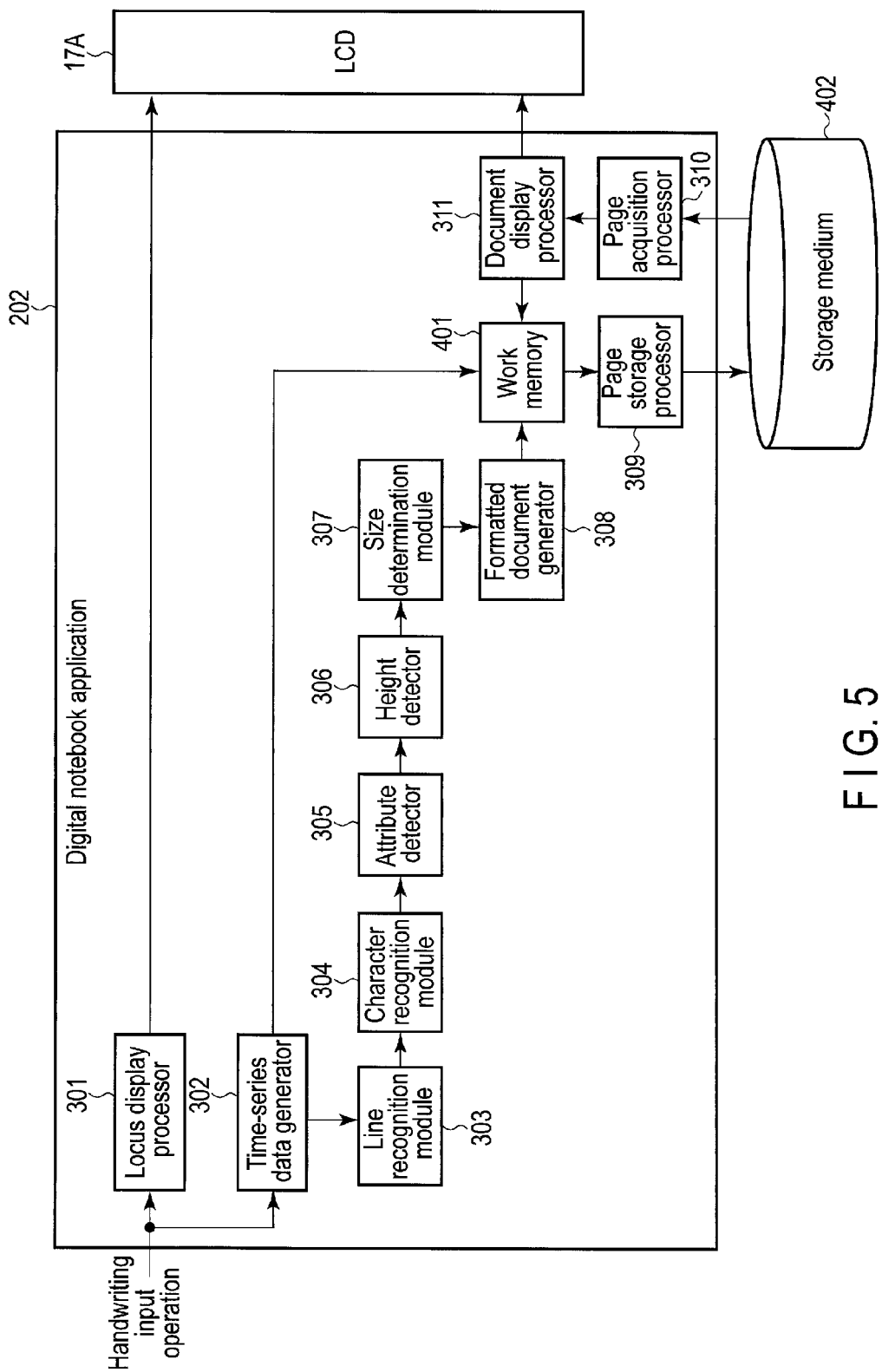
FIG. 5 is an exemplary block diagram showing a functional configuration of a digital notebook application program executed by the electronic apparatus of the embodiment.

Next, a functional configuration of the digital notebook application program 202 executed by the tablet computer 10 is described with reference to FIG. 5. The digital notebook application program 202 creates, displays and edits a handwritten document by using stroke data items input by a handwriting input operation using the touchscreen display 17. The digital notebook application program 202 can format a handwritten document. That is, the digital notebook application program 202 can convert handwritten characters in a handwritten document into character codes and generate data of a formatted document (hereinafter referred to as formatted document data) in which characters (font) corresponding to the character codes are arranged.

The digital notebook application 202 includes, for example, a locus display processor 301, a time-series data generator 302, a line recognition module 303, a character recognition module 304, an attribute detector 305, a height detector 306, a size determination module 307, a formatted document generator 308, a page storage processor 309, a page acquisition processor 310, a document display processor 311, etc.

The touchscreen display 17 is configured to detect occurrence of events such as a touch, move (slide) and release. A touch is an event indicating that an external object has touched the screen. A move (slide) is an event indicating that a contact position has been moved while the external object is kept in contact with the screen. A release is an event indicating that the external object has been lifted from the screen.

The locus display processor 301 and the time-series data generator 302 receive a touch or move (slide) event generated by the touchscreen display 17, and thereby detect a handwriting input operation. The touch event includes coordinates of a contact position. The move (slide) event includes coordinates of a contact position as a destination. Therefore, the locus display processor 301 and the time-series data generator 302 can receive a series of coordinates corresponding to a locus of the movement of the contact position from the touchscreen display 17.

The locus display processor 301 receives the series of coordinates from the touchscreen display 17 and displays, based on the series of coordinates, a locus of each stroke handwritten by the handwritten input operation using the pen 100, etc., on the screen of the LCD 17A in the touchscreen display 17. The locus of the pen 100 during the time when the pen 100 is kept in contact with the screen, i.e., the locus of each stroke is drawn on the screen of the LCD 17A by the locus display processor 301.

The time-series data generator 302 receives the series of coordinates output from the touchscreen display 17, and generates, based on the series of coordinates, time-series data (stroke data items) having the structure described in detail with reference to FIG. 3. In this case, the time-series data, i.e., coordinates and timestamp data corresponding to each point on the strokes may be temporally stored in a work memory 401.

The page storage processor 309 stores the generated time-series data (time-series data temporally stored in the work memory 401) in the storage medium 402 as handwritten document data. The storage medium 402 is, for example, a storage device in the tablet computer 10.

The page acquisition processor 310 reads arbitrary pre-stored handwritten document data from the storage medium 402. The read handwritten document data is transmitted to the document display processor 311. The document display processor 311 analyzes the handwritten document data and displays, based on the analysis result, loci of respective strokes indicated by time-series data as a handwritten document (handwritten page) on the screen.

By the above configuration, the user can create and view a handwritten document including handwritten characters.

In addition, the handwritten characters in the created handwritten document can be converted into character codes by character recognition. A process of converting handwritten document data including time-series data generated by the time-series data generator 30 into formatted document data including character codes corresponding to handwritten characters in the handwritten document is hereinafter described.

First, the line recognition module 303 recognizes lines included in the handwritten document by using the handwritten document data. For example, the line recognition module 303 recognizes lines each including one or more handwritten characters in the handwritten document by using stroke data items (time-series coordinates) included in the handwritten document data. More specifically, the line recognition module 303 recognizes lines based on a change of coordinates of strokes handwritten in the handwritten document by using stroke data items corresponding to the handwritten strokes.

For example, when characters are horizontally written in the handwritten document, it is expected that the user writes characters belonging to a line from left to right in the handwritten document. Therefore, the line recognition module 303 detects coordinates indicating that a contact position of the object (finger or pen 100) on the touchscreen display 17 is moved from the end of a line to the start of the next line, from the time-series data (stroke data items).

More specifically, the line recognition module 303 detects two continuously-handwritten strokes in which an x-coordinate (coordinate in a horizontal direction) is greatly changed from right to left in the handwritten document, based on the coordinate data series in the order of handwriting. For example, by using the last coordinate data item of the Nth stroke and the first coordinate data item of the (N+1)th stroke subsequent to the Nth stroke, when an absolute value of a difference between an x-coordinate of the last coordinate data item and an x-coordinate of the first coordinate item is larger than or equal to a threshold value, the line recognition module 303 detects that one or more strokes ending with the Nth stroke belong to a line different from a line to which one or more strokes beginning with the (N+1)th stroke belong. The line recognition module 303 recognizes lines in the handwritten document by detecting a gap between the lines in the same manner.

Next, the character recognition module 304 recognizes character codes corresponding to the handwritten characters in the recognized lines. That is, the character recognition module 304 performs character recognition of handwritten characters in each of the lines and thereby converts the handwritten characters into character codes. The character recognition module 304 recognizes a character corresponding to at least one stroke of the strokes in each line.

For example, by using one or more stroke data items corresponding to one or more strokes (strokes to be processed) of the strokes, the character recognition module 304 calculates a first feature indicating a shape of the one or more strokes. Then, the character recognition module 304 detects a character having a feature similar to the calculated first feature by using character dictionary data previously stored in the storage medium 402. In the character dictionary data, for example, characters and features corresponding to the characters are defined. Therefore, the character recognition module 304 converts a handwritten character corresponding to the strokes to be processed into a character code by recognizing a character having a second feature whose degree of similarity to the calculated first feature is greater than or equal to a threshold value, from the characters defined in the character dictionary data.

The character recognition module 304 may detect candidate characters each having a feature whose degree of similarity to the first feature is greater than or equal to a threshold value, from the characters defined in the character dictionary data. In this case, the character recognition module 304 narrows down a likely character (character having a high likelihood) with respect to the strokes to be processed from the detected candidate characters based on, for example, characters recognized from strokes near the strokes to be processed, and language dictionary data indicating co-occurrence probability of words and characters. The strokes near the strokes to be processed are, for example, right and left strokes of the strokes to be processed. The character recognition module 304 thus determines a character corresponding to the strokes to be processed.

The attribute detector 305, the height detector 306 and the size determination module 307 determine a display size (font size) of one or more characters corresponding to one or more handwritten characters in each line (i.e., characters indicated by character codes obtained by the character recognition) in the formatted document. The attribute detector 305, the height detector 306 and the size determination module 307 determine a display size of characters per line of a formatted document.

Incidentally, a display size of characters corresponding to a line in a formatted document is often determined based on a height of the line in a handwritten document.

Figure 6:
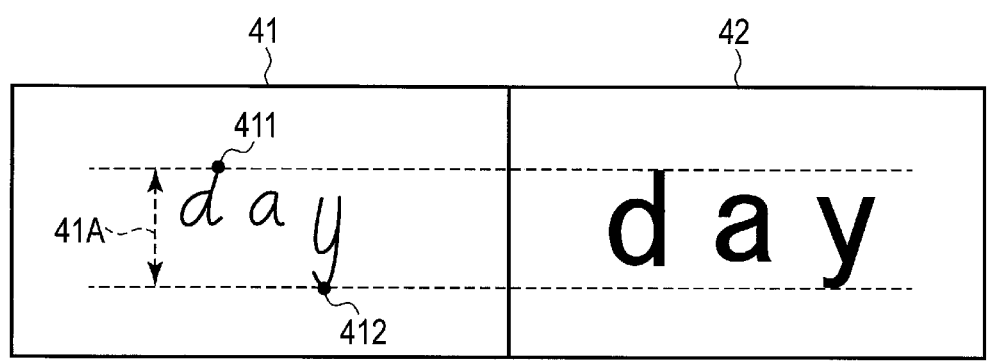
FIG. 6 is an illustration of an example in which handwritten characters are converted into characters (font) of an inappropriate size.

In an example shown in FIG. 6, characters (font) 42 corresponding to a handwritten character string "day" 41 in a certain line are displayed in a font size based on a height 41A of the handwritten character string "day" 41. The height 41A is a difference (difference in a vertical direction) between a y-coordinate of the top 411 of strokes corresponding to the handwritten character string 41 (in this case, a stroke corresponding to "d") and a y-coordinate of the bottom 412 of the strokes corresponding to the handwritten character string 41 (in this case, a stroke corresponding to "y"). If a font size is determined based on the height 41A of the handwritten character string 41, however, there is a possibility that an appropriate font size in accordance with the handwritten characters cannot be determined due to variations in, for example, position, size, shape and the like of the handwritten characters.

In the handwritten character string "day" 41, for example, the character "y" is written in a shape protruding downward in comparison with the other characters "d" and "a". The height 41A of the line corresponding to the handwritten character string 41 includes a height of the character "y" protruding downward. Accordingly, if a font size is determined based on the height 41A of the line, the determined font size may be a size not desired by the user due to variations in height of the characters in the handwritten character string 41. For example, if a font size is determined such that the characters (font) 42 are aligned in accordance with the height 41A of the handwritten character string "day" 41, the characters 42 are displayed in an inappropriate size, i.e., a size too large compared to the size of the handwritten character string 41. That is, a display size of a font of the characters 42 arranged instead of the handwritten character string 41 cannot be equalized with the display size of the handwritten character string 41.

Therefore, in the present embodiment, a first character corresponding to a first handwritten character detected from strokes input in handwriting and a second character corresponding to a second handwritten character detected from the strokes are displayed on the screen in a font size determined based on a combination of an attribute of the first character and a size of at least one first stroke corresponding to the first handwritten character, or a combination of an attribute of the second character and a size of at least one second stroke corresponding to the second handwritten character. That is, in the present embodiment, when a handwritten document including handwritten characters is converted into a formatted document including characters (font), a display font size on the screen of at least one character (font) corresponding to at least one of one or more handwritten characters in a certain line in the handwritten document is determined based on an attribute of the at least one character (character code) corresponding to the at least one handwritten character in the line, and a size (for example, a height) of the at least one handwritten character.

Figure 7:
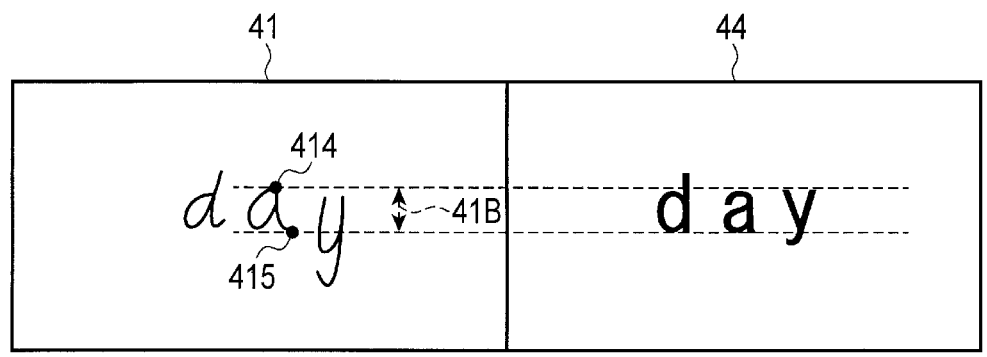
FIG. 7 is an illustration of an example in which handwritten characters are converted into characters (font) of an appropriate size by the electronic apparatus of the embodiment.
Figure 8:
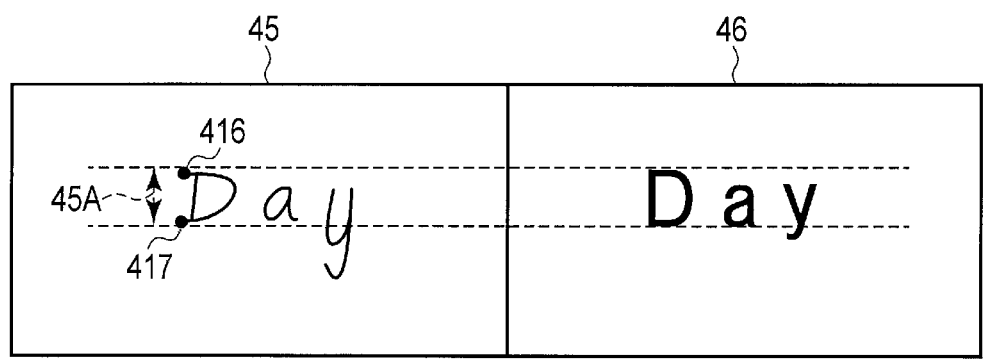
FIG. 8 is an illustration of another example in which handwritten characters are converted into characters (font) of an appropriate size by the electronic apparatus of the embodiment.

FIGS. 7 and 8 show examples in which handwritten characters are converted into characters (font) of an appropriate size by the digital notebook application 202 of the present embodiment.

In FIG. 7, a font size is determined based on an attribute of a character "a" in a handwritten character string "day" 41 and a height 41B of the character "a", i.e., a difference between a y-coordinate of the top 414 and a y-coordinate of the bottom 415 of a stroke corresponding to the character "a".

In FIG. 8, a font size is determined based on an attribute of a character "D" in a handwritten character string "Day" 45 and a height 45A of the character "D", i.e., a difference between a y-coordinate of the top 416 and a y-coordinate of the bottom 417 of a stroke corresponding to the character "D".

For such font size determination, the attribute detector 305 first detects an attribute of a character (character code) recognized from a line to be processed (hereinafter referred to as target line). For example, the attribute detector 305 detects an attribute of at least one character corresponding to at least one of one or more handwritten characters in the target line. A character whose attribute is detected is a character corresponding to an arbitrary handwritten character in the target line (for example, the start handwritten character of the line, a handwritten character at an arbitrary position in the line, a handwritten character other than the last handwritten character of the line, etc.). For example, the attribute detector 305 may detect attributes of characters (character codes) corresponding to the handwritten characters in the target line sequentially from the start character, until a character of a specific attribute is detected from the line.

FIG. 9 shows an example of attributes of characters detected by the attribute detector 305. As shown in FIG. 9, each of characters 55, 56, 57 and 58 of multiple types is associated with one of the attributes based on a shape of the character.

An attribute of a character is determined based on, for example, which one or more of partial regions includes the shape of the character. The partial regions are defined by dividing a region 60 including characters (for example, alphabetical characters) of the attributes. For example, the partial regions are three partial regions 61, 62 and 63 defined by vertically dividing the region 60 in three (i.e., dividing a height of the region 60 in three). These three partial regions 61, 62 and 63 are also called a first partial region 61, a second partial region 62 and a third partial region 63 from the top.

As shown in FIG. 9, a character of a first attribute has a shape included in a region 51 constituted by the first partial region 61 and the second partial region 62, and parts of the character of the first attribute are included in the first partial region 61 and the second partial region 62, respectively. A character of a second attribute has a shape included in the second partial region 62. A character of a third attribute has a shape included in a region 52 constituted by the second partial region 62 and the third partial region 63, and parts of the character of the third attribute are included in the second partial region 62 and the third partial region 63, respectively. A character of a fourth attribute has a shape included in the region 60 (region constituted by the first partial region 61, the second partial region 62 and the third partial region 63), and parts of the character of the fourth attribute are included in the first partial region 61, the second partial region 62 and the third partial region 63, respectively.

Each of characters of multiple types such as alphabetical characters is associated with one of the attributes.

For example, capital alphabetical characters "A" to "Z" are characters 55 of the first attribute each having a shape included in the region 51 constituted by the first partial region 61 and the second partial region 62, and parts of each of the capital alphabetical characters are included in the first partial region 61 and the second partial region 62, respectively. Similarly, alphabetical characters "b", "d", "f", "h", "i", "k", "l" and "t" are also characters 55 of the first attribute.

Alphabetical characters "a", "c", "e", "m", "n", "o", "r", "s", "u", "v", "w", "x" and "z" are characters 56 of the second attribute each having a shape included in the second partial region 62.

Alphabetical characters "g", "p", "q" and "y" are characters 57 of the third attribute each having a shape included in the region 52 constituted by the second partial region 62 and the third partial region 63, and parts of each of the characters are included in the second partial region 62 and the third partial region 63, respectively.

An alphabetical character "j" is a character 58 of the fourth attribute having a shape included in the region 60, and parts of the character are included in the first partial region 61, the second partial region 62 and the third partial region 63, respectively.

The attribute detector 305 detects one of the attributes thus defined as an attribute of a character (character code) corresponding to the recognized handwritten character.

Next, the height detector 306 detects a size (for example, a height) of at least one of the one or more handwritten characters in the target line. For example, by using stroke data of a handwritten character corresponding to the character code whose attribute has been detected, the height detector 306 detects a difference in the vertical direction between a coordinate of the top and a coordinate of the bottom of at least one stroke corresponding to the handwritten character, as a size (height) of the character.

The size determination module 307 determines a font size based on a combination of the attribute of the character corresponding to the at least one character of the one or more characters in the target line, which is detected by the attribute detector 305, and the height of the at least one character detected by the height detector 306 (i.e., the size of the at least one stroke corresponding to the character). That is, the size determination module 307 determines a font size in which one or more characters corresponding to the one or more handwritten characters in the target line are displayed in a formatted document.

For example, the attribute detector 305 detects an attribute of a first character corresponding to a first handwritten character detected from strokes input in handwriting, and detects an attribute of a second character corresponding to a second handwritten character detected from the strokes. The height detector 306 detects a size of one or more first strokes corresponding to the first handwritten character and a size of one or more second strokes corresponding to the second handwritten character. Then, the size determination module 307 determines a font size based on a combination of the attribute of the first character corresponding to the first handwritten character and the size of the first strokes corresponding to the first handwritten character, or a combination of the attribute of the second character corresponding to the second handwritten character and the size of the second strokes corresponding to the second handwritten character. At this time, when the attribute of the first character is the first attribute, a font size determined based on the combination of the attribute of the first character and the size of the first strokes is a first value. When the attribute of the first character is the second attribute, a font size determined based on the combination of the attribute of the first character and the size of the first strokes is a second value. The first value is different from the second value.

More specifically, when the handwritten character string "day" 41 shown in FIG. 7 is included in a target line, the character recognition module 304 recognizes three handwritten characters included in the handwritten character string 41 and thereby converts the three handwritten characters into three character codes. The attribute detector 305 detects the second attribute associated with the character "a" of the three characters corresponding to the converted three character codes. The height detector 306 detects a difference in the vertical direction between a coordinate 414 of the top and a coordinate 415 of the bottom of a stroke corresponding to "a" as a height 41B of the handwritten character "a", by using stroke data corresponding to the handwritten character "a".

Then, the size determination module 307 calculates a font size determined based on a combination of the attribute of the character "a" and the size of the stroke corresponding to the handwritten character "a". The size determination module 307 determines a display font size of characters 44 corresponding to the handwritten character string 41 based on the detected second attribute and the height 41B of the handwritten character "a". For example, the size determination module 307 determines the display font size of the corresponding characters based on the facts that the character "a" of the second attribute has a shape included in the second partial region 62, and that the handwritten character "a" of the second attribute is handwritten in the height 41B. That is, the size determination module 307 calculates a font size in the case where a height of the second partial region 62 is the height 41B (i.e., a font size in the case where a height of the region 60 including characters of all attributes is three times as large as the height 41B). Then, the character size determination module 307 determines the calculated font size as a display font size on the screen of the one or more characters (characters indicated by character codes) corresponding to the one or more handwritten characters in the target line.

The size determination module 307 may determine a font size of characters corresponding to a handwritten character string in a certain line based on a size (height) of the start character of the handwritten character string, on the assumption that the start character of the line is a capital alphabetical character of the first attribute.

For example, when a handwritten character string "Day" 45 shown in FIG. 8 is included in a target line, the character recognition module 304 recognizes three characters included in the handwritten character string 45 and thereby converts the three characters into three character codes. Since "D" is the start character of the line, the first attribute corresponding to the character "D" is determined without performing attribute detection by the attribute detector 305, on the assumption that the start character of the line is a capital character. The height detector 306 detects a difference in the vertical direction between a coordinate 416 of the top and a coordinate 417 of the bottom of strokes corresponding to "D" as a height 45A (size of strokes) of the handwritten character "D", by using stroke data corresponding to the handwritten character "D".

Then, the size determination module 307 determines a display font size of characters 46 corresponding to the handwritten character string 45 based on the determined first attribute and the height 45A of the handwritten character "D". For example, the size determination module 307 determines the display font size of the corresponding characters based on the facts that the character "D" of the first attribute is included in the region 51 constituted by the first partial region 61 and the second partial region 62, and that the character "D" of the first attribute is handwritten in the height 45A. That is, the size determination module 307 calculates a font size in the case where the sum of a height of the first partial region 61 and a height of the second partial region 62 is the height 45A (i.e., a font size in the case where a height of the region 60 including characters of all attributes is one and a half times as large as the height 45A). Then, the size determination module 307 determines the calculated font size as a display font size on the screen of the one or more characters corresponding to the one or more handwritten characters in the target line.

The size determination module 307 may determine a font size by using, for example, a font size determination table defined previously.

FIG. 10 shows a structural example of the font size determination table. The font size determination table is a table in which font sizes each determined based on a combination of an attribute of a character and a size (height) of a stroke corresponding to the character are defined. The size determination module 307 detects a font size corresponding to a combination of an attribute of a character detected by the attribute detector 305 and a height of the character detected by the height detector 306, from the font size determination table.

The formatted document generator 308 arranges characters recognized by the character recognition module 304 (i.e., a font corresponding to character codes), which have the determined font size, in a formatted document, and generates formatted document data corresponding to the formatted document. For example, the formatted document generator 308 generates formatted document data including pairs of character codes and font sizes. The document display processor 311 can therefore display the formatted document including characters of an appropriate size per line on the screen of the LCD 17A by using the formatted document data.

The page storage processor 309 may store the generated formatted document data in the storage medium 402.

The page acquisition processor 310 reads arbitrary prestored formatted document data from the storage medium 402. The read formatted document data is transmitted to the document display processor 311. The document display processor 311 analyzes the formatted document data, and displays, based on the analysis result, a formatted document (formatted page) in which characters indicated by character codes are arranged in the associated font size, on the screen.

By the above configuration, characters can be displayed in an appropriate size when a handwritten document including handwritten characters is converted into a formatted document including character codes.

A handwritten character string often includes a character having low stability in handwriting. The character having low stability is, for example, shapes of a character handwritten by users are variable, a character whose size and height are variable with respect to the other characters in the same line when being handwritten, etc.

In the example shown in FIG. 11, the handwritten character string "day" 41 includes the character "y" having low stability in handwriting. The character "y" is handwritten in a shape protruding downward in comparison with the other characters "d" and "a". When a display font size of characters (font) corresponding to such a handwritten character string "day" 41 is determined, characters 43 may be displayed in an inappropriate size which is too large compared to the size of the handwritten character string 41 by determining the font size based on a height 41B of the character "y" having low stability. The height 41B is a difference in the vertical direction between a coordinate 413 of the top and a coordinate 412 of the bottom of a stroke corresponding to "y".

Therefore, when one or more characters (character codes) corresponding to one or more handwritten characters in a target line are recognized, the size determination module 307 of the present embodiment may determine a display font size of the one or more characters in the line based on a height of a handwritten character corresponding to a character of a specific attribute. The specific attribute is an attribute having statistically-high stability of characters (for example, an attribute having a statistically-high correlation between a height of a line and a height of a handwritten character). For example, of the four attributes shown in FIG. 9, the second attribute corresponding to characters having a low probability of extending a stroke in the vertical direction ("a", "c", etc.) is used as the specific attribute. Since the stability of characters can be calculated by analyzing preliminarily collected handwritten documents, an attribute having stability of characters greater than or equal to a threshold value may be used as the specific attribute based on the calculation result.

More specifically, when one or more characters (character codes) corresponding to one or more handwritten characters in a target line are recognized by the character recognition module 304, the attribute detector 305 detects an attribute corresponding to each of the one or more characters.

The height detector 306 extracts one or more characters of the specific attribute from the one or more characters corresponding to the line based on the detected attributes, and detects heights (sizes of strokes) of one or more handwritten characters corresponding to the extracted one or more characters of the specific attribute. Then, the size determination module 307 determines a font size based on the specific attribute and the detected heights of the one or more handwritten characters. For example, the size determination module 307 determines the font size based on the specific attribute and a median value of the detected heights of the one or more handwritten characters. By using the median value of the detected heights of the one or more handwritten characters, a singular value included in the heights of the one or more handwritten characters can be excluded.

The size determination module 307 may determine the font size based on a weighted average (or weighted sum) of heights of one or more handwritten characters corresponding to one or more characters of the specific attribute and heights of one or more handwritten characters corresponding to one or more characters of other attributes. In the calculation of the weighted average, for example, a heavy weighting is assigned to heights of characters of an attribute having statistically-high stability of characters, and a light weighting is assigned to heights of characters of an attribute having statistically-low stability of characters.

In this manner, the effect of a height of a character of an attribute having statistically-low stability can be diminished when a display font size of character codes is determined.

In addition, the size determination module 307 may determine the font size without using a height of the last handwritten character in the line. In other words, the size determination module 307 may determine the font size by using heights of one or more handwritten characters in the line excluding the last character of the line.

For example, it is assumed that the last character of the line is a punctuation mark such as a period. In this case, an inappropriate size may be determined as the font size due to a height of a character corresponding to the period. Therefore, the size determination module 307 determines the font size without using the height of the last handwritten character in the line.

In the above example, the case where characters are alphabetical characters is described. However, the present embodiment is not limited to the alphabet, and may be applied to characters of other languages such as kanji and kana (hiragana and katakana) characters of Japanese.

For example, even in the case of kanji and kana characters, attributes can be defined based on shapes of characters as shown in FIG. 9. More specifically, based on the fact that kanji characters are often handwritten in a size larger than kana characters, for example, kanji characters are defined as characters of an attribute having a shape included in a first region, and kana characters are defined as characters of an attribute having a shape included in a second region smaller than the first region.

In the case of a Japanese handwritten document, the attribute detector 305 detects an attribute of a character (character code) corresponding to at least one of one or more handwritten characters in a target line, based on the above definition. Then, based on the detected attribute and a height of the at least one handwritten character detected by the height detector 306, the size determination module 307 determines a display font size in a formatted document of one or more characters corresponding to the one or more handwritten characters in the target line.

As described above, the present embodiment can be applied to handwritten characters of various languages by defining attributes based on shapes of characters.

Next, an example of the procedure of a handwriting input process executed by the digital notebook application 202 is described with reference to a flowchart of FIG. 12.

First, the locus display processor 301 displays loci (strokes) of the movement of the pen 100, etc., by a handwriting input operation on the display 17A (block B11). The time-series data generator 302 generates the above-described time-series data (stroke data items arranged in the time-series order) based on coordinate series corresponding to the loci by the handwriting input operation (block B12). The time-series data generator 302 may temporally store the generated time-series data in the work memory 401. The page storage processor 309 may store the time-series data generated by the time-series data generator 302 (time-series data temporally stored in the work memory 401) in the storage medium 402 as handwritten document data.

Figure 13:
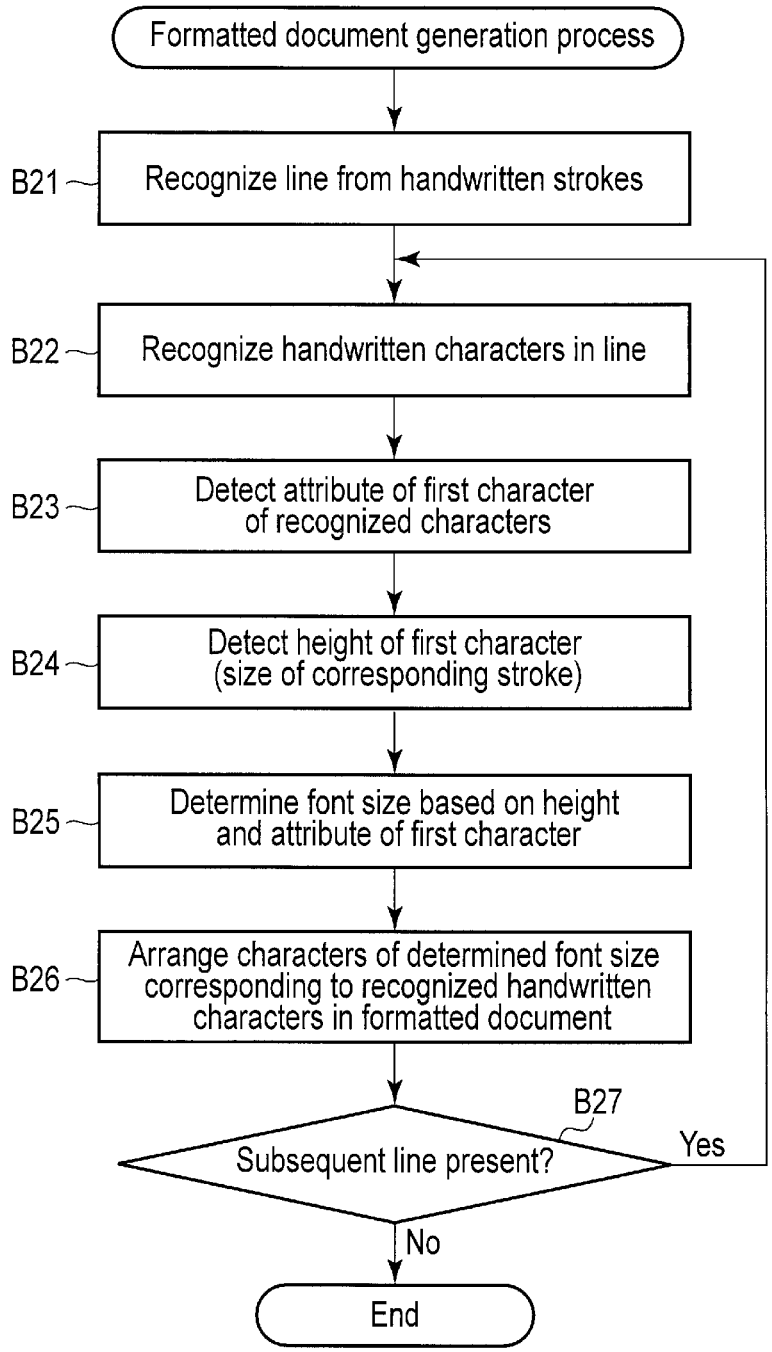
FIG. 13 is a flowchart showing an example of the procedure of a formatted document generation process executed by the electronic apparatus of the embodiment.

A flowchart of FIG. 13 shows an example of the procedure of a formatted document generation process executed by the digital notebook application 202.

First, the line recognition module 303 recognizes one or more lines from strokes by using the generated time-series data (handwritten document data) (block B21). The character recognition module 304 recognizes one or more characters from strokes corresponding to a line to be processed (target line) of the recognized one or more lines (block B22). For example, in a horizontally-written document, the recognized one or more lines are sequentially set as the target line from the top. The character recognition module 304 converts each of one or more handwritten characters in the target line into a character code.

The attribute detector 305 detects an attribute of a first character (at least one first character) of the one or more recognized characters (block B23). Then, the height detector 306 detects a height of the fist character (size of one or more corresponding strokes) (block B24). For example, the height detector 306 detects a coordinate of the top and a coordinate of the bottom by using coordinates corresponding to one or more strokes constituting the first character, and calculates a difference between the maximum coordinate and the minimum coordinate in the vertical direction as a height of the first character.

The size determination module 307 determines a font size based on the detected height and attribute of the first character (block B25). The size determination module 307 determines the font size by using, for example, a font size determination table, in which a font size is determined based on the height and attribute of the first character. The formatted document generator 308 arranges characters of the determined font size corresponding to the recognized one or more characters, in the formatted document (block B26).

The size determination module 307 may determine the font size based on a combination of an attribute of a first character corresponding to a first handwritten character of one or more handwritten characters in the target line and a size of at least one first stroke corresponding to the first handwritten character, or a combination of an attribute of a second character corresponding to a second handwritten character of the one or more handwritten characters and a size of at least one second stroke corresponding to the second handwritten character.

Next, the line recognition module 303 determines whether a line subsequent to the target line is present (block B27). If the subsequent line is present (Yes in block B27), the subsequent line is set as a new target line, and the process returns to block B22. If the subsequent line is not present (No in block B27), the process is finished.

As described above, according to the present embodiment, characters can be displayed in an appropriate size when a handwritten document including handwritten characters is converted into a formatted document including character codes. The locus display processor 301 and the time-series data generator 302 detect an operation of inputting strokes in handwriting, display the strokes on the screen and generate corresponding stroke data. The size determination module 307 determines a font size based on a combination of an attribute of a first character corresponding to a first handwritten character detected from the strokes and a size of at least one first stroke corresponding to the first handwritten character, or a combination of an attribute of a second character corresponding to a second handwritten character detected from the strokes and a size of at least one second stroke corresponding to the second handwritten character. The document display processor 311 displays the first character and the second character in the determined font size on the screen.

As described above, variations in display size in the case of displaying characters (font) corresponding to handwritten characters in a line can be reduced by determining a font size based on the combination of the attribute of the first character corresponding to the first handwritten character in the line and the size of the at least one first stroke corresponding to the first handwritten character, or the combination of the attribute of the second character corresponding to the second handwritten character and the size of the at least one second stroke corresponding to the second handwritten character.

All the procedures of the present embodiment described with reference to the flowcharts of FIGS. 12 and 13 can be executed by software. Therefore, the same advantage as the present embodiment can easily be achieved by installing a program that executes the procedures on a general computer through a computer-readable storage medium storing the program, and executing the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
 a processor configured to input strokes in handwriting;
 a display controller configured to display on a screen a first character and a second character in a font size, the first character corresponding to a first handwritten character detected from the strokes, the second character corresponding to a second handwritten character detected from the strokes, the font size determined based on a combination of an attribute of the first character and a size of at least one stroke corresponding to the first handwritten character or a combination of an attribute of the second character and a size of at least one stroke corresponding to the second handwritten character,
 wherein an attribute of a character is determined based on a shape of the character included in a region comprising one or more of partial regions, and
 wherein:
 the region comprises a first partial region, a second partial region and a third partial region;
 a character of a first attribute has a shape included in the first partial region and the second partial region;
 a character of a second attribute has a shape included in the second partial region;
 a character of a third attribute has a shape included in the second partial region and the third partial region; and
 a character of a fourth attribute has a shape included in the first partial region, the second partial region and the third partial region.

2. The electronic apparatus of claim 1, wherein
 when the attribute of the first character is the first attribute and a determined font size is a first value, and
 when the attribute of the first character is the second attribute and a determined font size is a second value,
 the first value is different from the second value.

3. The electronic apparatus of claim 1, wherein the display controller is configured to display, on the screen, the first character and the second character in the font size determined based on a combination of the first attribute and the size of the at least one stroke, when the first handwritten character is a start character of a line.

4. A method comprising:
 inputting strokes in handwriting;
 displaying a first character and a second character in a font size, the first character corresponding to a first handwritten character detected from the strokes, the second character corresponding to a second handwritten character detected from the strokes, the font size determined based on a combination of an attribute of the first character and a size of at least one stroke corresponding to the first handwritten character or a combination of an attribute of the second character and a size of at least one stroke corresponding to the second handwritten character,
 wherein an attribute of a character is determined based on a shape of the character included in a region comprising one or more of partial regions, wherein:
the region comprises a first partial region, a second partial region and a third partial region;
a character of a first attribute has a shape included in the first partial region and the second partial region;
a character of a second attribute has a shape included in the second partial region;
a character of a third attribute has a shape included in the second partial region and the third partial region; and
a character of a fourth attribute has a shape included in the first partial region, the second partial region and the third partial region.

5. The method of claim 4, wherein
when the attribute of the first character is the first attribute, and a determined font size is a first value, and
when the attribute of the first character is the second attribute, and a determined font size is a second value,
the first value is different from the second value.

6. The method of claim 4, wherein the displaying comprises displaying the first character and the second character in the font size determined based on a combination of the first attribute and the size of the at least one stroke, when the first handwritten character is a start character of a line.

7. A non-transitory computer-readable storage medium having stored a program which is executable by a computer, the program controlling the computer to execute functions of:
inputting strokes in handwriting;
displaying a first character and a second character in a font size, the first character corresponding to a first handwritten character detected from the strokes, the second character corresponding to a second handwritten character detected from the strokes, the font size determined based on a combination of an attribute of the first character and a size of at least one stroke corresponding to the first handwritten character or a combination of an attribute of the second character and a size of at least one stroke corresponding to the second handwritten character,
wherein an attribute of a character is determined based on a shape of the character included in a region comprising one or more of partial regions,
wherein:
the region comprises a first partial region, a second partial region and a third partial region;
a character of a first attribute has a shape included in the first partial region and the second partial region;
a character of a second attribute has a shape included in the second partial region;
a character of a third attribute has a shape included in the second partial region and the third partial region; and
a character of a fourth attribute has a shape included in the first partial region, the second partial region and the third partial region.

8. The storage medium of claim 7, wherein
when the attribute of the first character is the first attribute, and the determined font size is a first value, and
when the attribute of the first character is a second attribute, the determined font size is a second value,
the first value is different from the second value.

9. The storage medium of claim 7, wherein the displaying comprises displaying, the first character and the second character in the font size determined based on a combination of the first attribute and the size of the at least one stroke, when the first handwritten character is a start character of a line.

* * * * *